United States Patent [19]

Haag et al.

[11] 4,075,356
[45] Feb. 21, 1978

[54] CEREAL PROCESS AND PRODUCT

[75] Inventors: Robert A. Haag, Marietta, Ga.; Patrick M. Rousseau, Lansing; Thom O. Martin, Richland, both of Mich.

[73] Assignee: General Foods Corporation, White Plains, N.Y.

[21] Appl. No.: 606,672

[22] Filed: Aug. 21, 1975

Related U.S. Application Data

[63] Continuation of Ser. No. 433,628, Jan. 16, 1974, abandoned.

[51] Int. Cl.² .............................................. A23B 4/10
[52] U.S. Cl. ................................... 426/285; 426/303; 426/453
[58] Field of Search .............. 259/3; 23/313; 426/103, 426/285, 303, 618–620, 656, 658, 661, 453

[56] References Cited

U.S. PATENT DOCUMENTS

| | | | |
|---|---|---|---|
| 2,278,466 | 4/1942 | Musher | 426/305 |
| 2,908,487 | 10/1959 | Fischer | 259/25 |
| 2,915,300 | 12/1959 | Fischer | 259/85 |
| 3,135,612 | 6/1964 | Hair | 99/94 |
| 3,158,358 | 11/1964 | Fischer | 259/24 |
| 3,502,304 | 3/1970 | Pfrengle | 259/3 |
| 3,615,647 | 10/1971 | Kassens | 117/85 |
| 3,635,443 | 1/1972 | Fischer | 259/3 |

Primary Examiner—Hiram H. Bernstein
Attorney, Agent, or Firm—Bruno P. Struzzi; Michael J. Quillinan; Mitchell D. Bittman

[57] ABSTRACT

Two planes of dissimilar droplets, an oil phase and a syrup phase, are sequentially centrifugally distributed onto a cascading assortment of dissimilarly sized and shaped pulverulent food particles of varying densities, an aggregate thereof being formed by the action of high speed paddle means; the aggregates being transformed into agglomerates by tumbling in an undulating rotating zone.

9 Claims, 5 Drawing Figures

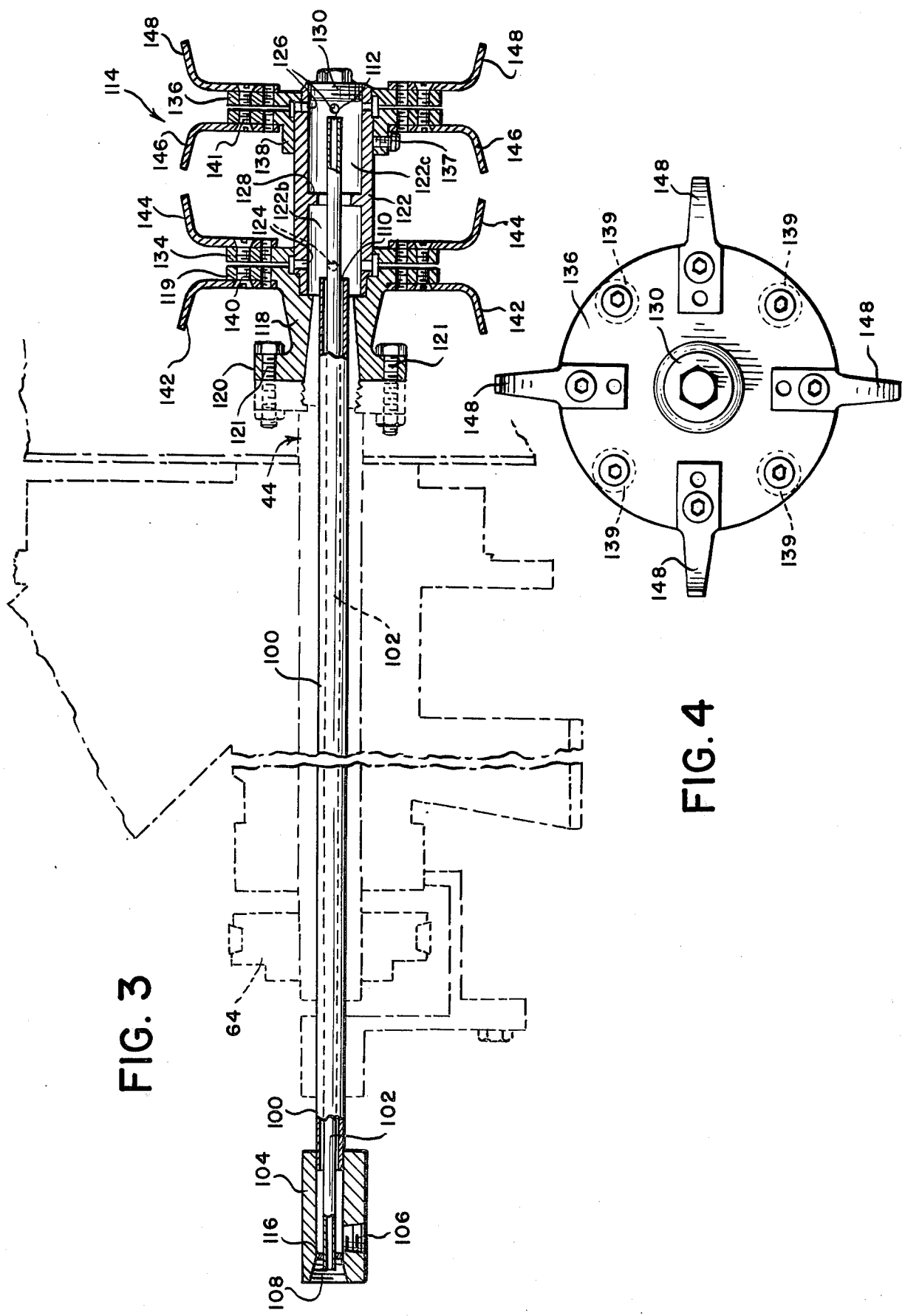

CEREAL PROCESS AND PRODUCT

This is a continuation of application Ser. No. 433,628, filed Jan. 16, 1974, now abandoned.

BACKGROUND OF THE INVENTION

The present invention relates to an improvment in the process of intimately coating a plurality of liquid phases sequentially onto an assortment of alimentary farinaceous and proteinaceous particles.

In the art of aggregating, and, in turn, agglomerating dissimilarly sized and constituted food particles a need arises to provide a consistent build-up of said particles into a more or less permanent and predictably controlled bulk volume. Customary coating reels employed in the accumulation of individual particles wherein one particle coats another do not meet the requirements for a satisfactory ultimate agglomeration in view of the tendency of such coating means to induce a balling action which result in a relatively non-uniform and non-heterogeneous distribution of the individual particles. In the case of cereal mixtures of so-called "natural" ingredients where a granular assortment of nutmeats, cereal flakes and/or puffs, fruit pieces et al. are to be aggregated and ultimately agglomerated into a stable matrix by means of coatings, a need arises to achieve a consistent build-up of an aggregate which in turn is finished into a relatively stable agglomerated matrix. The problem of satisfying this need is compounded by the fact that such mixes as are indicated herein call for use of fats which commonly are vegetable oils such as cottonseed oil. Such fats preferably are to be applied in a manner which coats the individual and discrete particles and to some degree penetrate same. The ability to effectively accumulate varying size particles of varying densities in a stable matrix or agglomerate which is to be distributed and consumed as such in dry, ready-to-eat form or as other comestible in a dry grocery mix is also limited by the preference for an intimately distributed flavorful sugar syrup. The problem of mutual application of two dissimilar liquids, therefore, to such an assortment of food particles is complex.

STATEMENT OF THE INVENTION

It is accordingly among the specific and primary objects of the invention to provide means whereby a liquid-fat phase and a sugar-syrup phase are applied to a nutritionally balanced variety of granular food particles and typically cereal particles of varying shapes and densities as well as other protein and balancing fortifying food nutrient sources such as nutmeats, fruits and the like, said application resulting in a flavorful handleable agglomerate. In accordance with its more particular aspects, the invention calls for the operative employment of two dissimilar liquid phases as coating matrices for inducing initial aggregation and ultimate agglomeration of said particles into a stable uniform granular-appearing particle of consequential size.

In accordance with this invention, droplets of a liquified triglyceride typically a cottonseed or coconut oil are caused to be distributed centrifugally within a rotating coating reel or drum in the form of a fine mist or fog whereby the mist coats the aforesaid particles as they are cascading and the triglyceride is caused to undergo migration therethrough and absorption at the surfaces thereof, this action being accentuated by the high speed rotation of paddles which fluidize the particles as they contact same during the coating process; thereafter a distinct and separate sugar-syrup coating fog or mist of like character is applied to the previously coated particles and intimately distributed thereover whereupon the aggregating particles become adhesive and tackify while undergoing a continuation to the tumbling action that is induced in the coating reel to produce a sequential build-up of aggregates of an assorted assemblage of particles. After a continuation of the two-phase coating process just described, the aggregates are transferred to an undulating rotating V-blending chamber wherein they undergo a series of distinct directional changes which chamber may be single- or multi-fold as will be understood from the accompanying drawings describing a best mode of apparatus for effecting this coating process.

Referring now to the accompanying drawings,

FIG. 3 is an enlarged side elevation view partly in section showing the elements of a coating system;

FIG. 4 is an enlarged end view of said elements; and

DETAILED DESCRIPTION OF THE INVENTION

Figure 1:
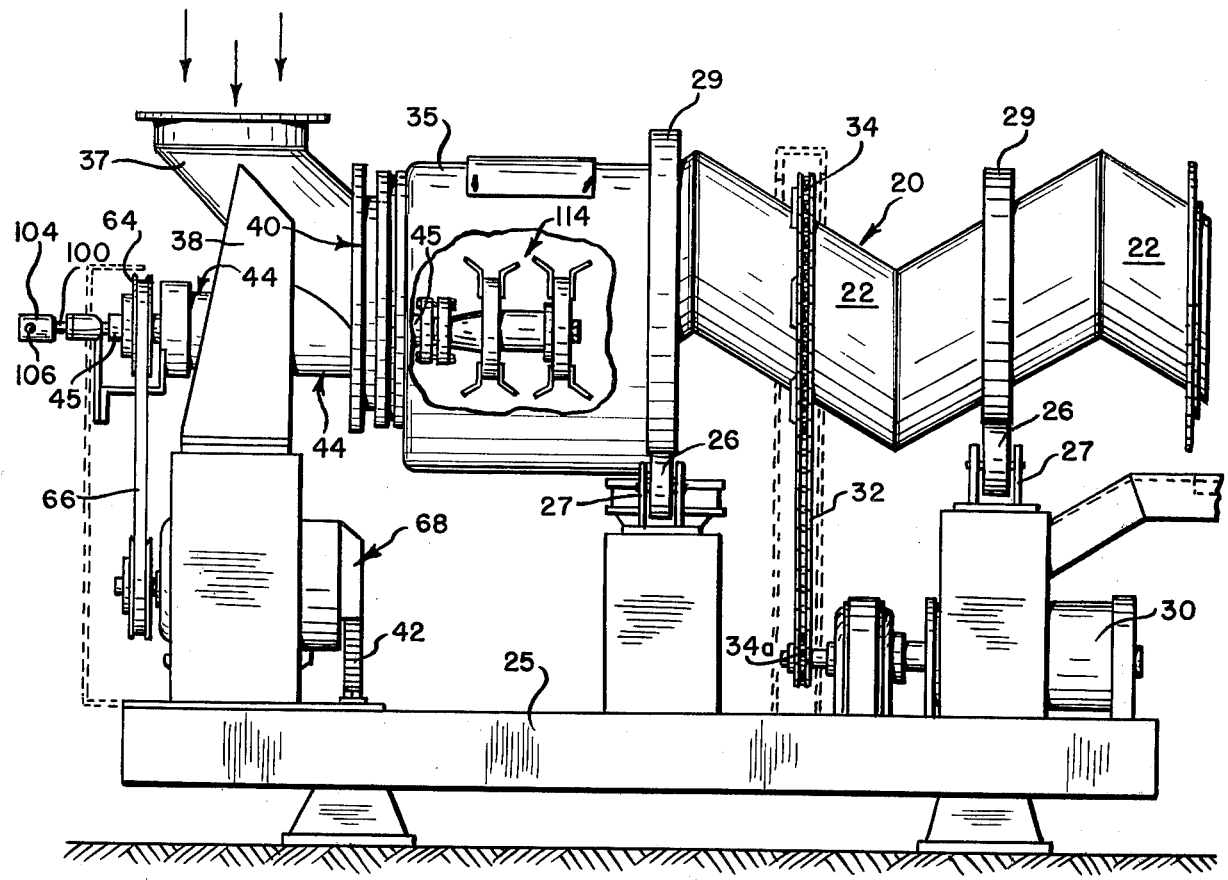
FIG. 1 is a side elevation view of aggregating and agglomerating apparatus.
Figure 2:
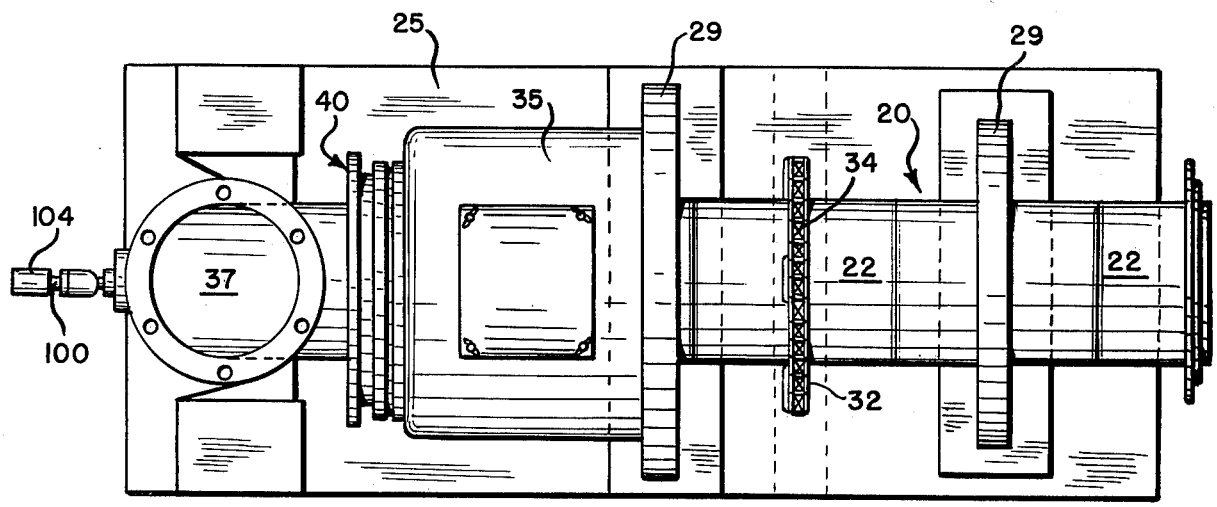
FIG. 2 is a top plan view of the apparatus in FIG. 1.
Figure 5:
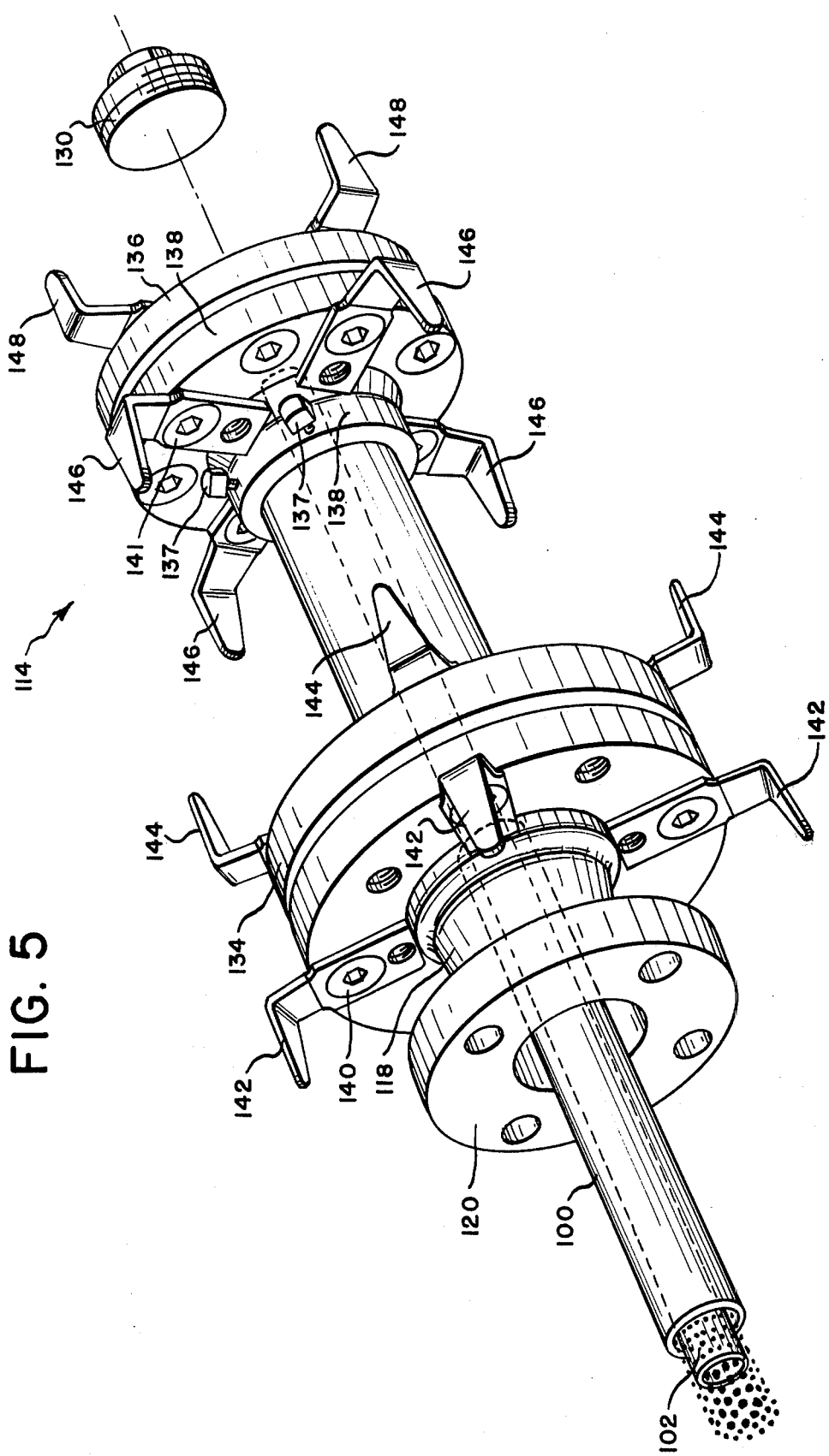
FIG. 5 is a perspective view showing the manner of droplet distribution in the coating system to be hereinafter described.

The foregoing aggregation and agglomeration are preferably practiced in a rotating blender wherein a plurality of the fog or liquid dispersions are generated in two distinct planes, the droplets thereof being caused to move radially outwardly and intercept a granular stream of solid particles entering one end of an elongated rotating container of generally tubular proportions which communicates with an undulant form of structure capable of continually withdrawing aggregates produced by the droplets wetting and thus tackifying the solid particles. The most preferred apparatus for use in accordance with this invention is of the type illustrated in U.S. Pat. No. 3,635,443 to Fischer issued Jan. 18, 1972 which patent is an improvement of the structure and method shown and described in U.S. Pat. No. 3,362,688 also issued Jan. 9, 1968 to Fischer, each of which patents are incorporated fully herein by reference as though they were a part of this specification as to the description of the details for rotation and orientation of the respective blending, aggregating and discharge assemblages described therein. Essentially these material handling machines as set forth in the patents as cited are intended to achieve a uniform blending of a liquid-solids dispersion wherein there is a predetermined churning action stemming from the drum or container being mounted so as to have its geometrical axis extend substantially in the same direction as the longitudinal axis of the undulating member whereby a continuous mixing within the drum is effected which mixing is preferably further advanced by the inlet openings to the drum being eccentric to the axis thereof and having means provided to continuously feed particulate material thereto, the material being eventually continuously withdrawn and discharged by tilting or by other means set forth in said Fisher patents to the undulant form of discharge structure, preferably a V- or zigzag form of angularly related cylinders intended to occasion precise and yet completed blending with minimal amount of post-blending. However, in accordance with the present invention as will be more specifically articulated herein, the operation of the present structure is to be contrasted with the blending structure of the Fischer patents in that the purpose is not to achieve avoidance of agglomeration but rather to induce aggregation and agglomeration both through the tumbling action within the drum and a rolling motion as the agglomerate advancing in the undulating section is perfected.

With respect to the Fischer type structure, liquid feed means are disclosed for projecting into the drum from a spray head disposed within the confines thereof and longitudinally oriented on an axis either coincident to that of the drum or eccentric to it. The present invention employs a similar type of liquid feed means so oriented as to provide a spray or fog which is intended to result in maximum uniformity of liquid coating on the solid particles. However, in accordance with the present invention two dissimilar liquids are introduced which liquids are caused to be centrifugally displaced at high speeds within two axially adjoining cylindrical rotating spray head chambers whose function is to cause the different films to initially be generated therewithin for each respective liquid and thereafter under the influence of continued centrifugation to be finely divided as a spray and be discharged radially into the feed of granular material.

A specific aspect of the invention is the use of discrete granular tackifying material present in the dry mix in such proportions as to occasion when wetted eventual agglomeration of farinaceous and/or proteinaceous granular material of the class hereinbefore described whereby an initially granular fat-coated particulate material is converted to a loose aggregate formation that is eventually agglomerated. In accordance with its more particular aspects, therefore, the invention involves the creation of an initial finely divided fat spray which preliminarily acts to coat the granular material aforesaid. Upon effecting a uniform blending under conditions which do not generate a significant crushing or other alteration of the particles per se or generate excessive work therein, the finely coated charge of material is introduced to a second distinct tackifying liquid phase which is aqueously based and is typically a sugar-syrup having a level of moisture operative to hydrate of "wet" a crystalline or amorphous tackifying agent present in the pulverulent mix, whereby with continued churning in the rotating drum means there is a further aggregation of particles until an intended size is derived.

Referring now to the drawings, the spray dispenser for achieving the stated two-zone atomization is bolted onto shaft means generally shown as 44, this reference numeral corresponding essentially to the shaft shown in FIG. 4 of U.S. Pat. No. 3,635,443. This shaft will be seen to comprise a tubular housing which rotatably mounts a hollow drive shaft 45 as by means of the ball bearing devices and bushings shown in the cited patent.

In lieu of the stationary liquid feed tube 52 shown therein, the feeding structure of the present invention is employed and this will be seen to comprise a stationary outer feeding tube 100 circumjacent and spaced from a stationary inner feeding tube 102. The inlet ends for the respective tubes are mounted in a housing 104 having respective inlet ports 106, 108 adapted to receive from supply means not shown a continuous flow of the respective liquid for delivery along the interior of the tubes to the discharge extremities thereof at 110, 112 within the dispensing means generally shown as 114. It will be noted that the compartment intermediate housing 104 and tube 102 at the entry port 106 is separated from the zone of liquid entering port 108 by a dam means generally shown as 116 so as to maintain two separate and distinct liquid flows through the passage of each respective tube 100 and 102.

Tubes 100 and 102 are mounted within annular hub 118 flanged at 120 and bolted at 121 to shaft 44. Hub 118 is thus adapted to be rotated around the tubes 100 and 102. A cylindrical manifold chamber 122 is fixedly seated within annular hub 118 and has a plurality of separate discharge openings 124, 126 as well as an annular dam intermediate said openings formed by inwardly projecting ring 128 circumjacent tube 102 but spaced therefrom so as to permit freedom of rotation therearound. A plug 130 tapped into the lateral extremity of member 122 permits necessary cleaning and adjustment as may be required.

Respective flange members 134, 136 are mounted on a flange portion 119 of hub 118 and a second hub 138 fixedly mounted onto member 122 as by means of a tapped key lug 137 which anchors hub 138 to manifold 122. Narrow annular spaces are thus provided intermediate the opposing faces of the flanges 134, 119 and 136, 138 respectively, the spacing between said flange plates being adjustable by means of spacer rings 139 shown hidden in FIG. 4 and the flange areas being maintained in fixed communication through intermediation of said rings by adjusting bolts 140, 141, said bolts being employed also to mount adjoining pairs of paddles 142, 144 and 146, 148 operative to promote particle advancement, fluidization, mixing and aggregation, all of which details of construction are set forth in the aforecited Fischer patents.

In operation, two dissimilar liquids will be delivered along the length of tubes 100, 102 continuously at a sufficient rate of supply to allow the liquids to occupy respective separate cylindrical chamber areas 122 b, c; with continued rotation at, say, 3500 rpm the body of liquid will be distributed as thin film under centrifugal force and be thereafter discharged through orifices 126, 124.

Granular alimentary material entering the rotating drum will initially be coated with a triglyceride fat or oil as the solids are tumbled, carried upward along the inside of the drum and cascade downwardly in the path of the fat droplets. The fat coating resulting imparts tenderness, protection against oxidative rancidity and flavor to the particles, all of which is achieved with the continuous spraying of the discrete droplets onto the granular particles which are fluidized by the fanning action of paddles 142, 144 rotating at high speeds to impel the charge of material and redistribute same. It is preferred to employ paddle blades 142, 144 mounted as shown on the spray generating means of the first coating zone. With the entire machine tilted the paddles are operative to occasion axial advance of the coated alimentary granular material but the primary utility of paddles 142, 144 is to impart a relatively vigorous churning action as the particles cascade within the drum and are intercepted by the finely dispersed triglyceride. In this aggregating zone the tackifying part of the mix, typically brown sugar or any moistenable hydrophilic granular or crystalline substance, will be partially coated by the fat thereby controlling the subsequent wetting thereof.

When the granular pulverulent mix as coated in the first zone is advanced to the second zone, generally defined by the volume intermediate paddles 146, 148, it is introduced to an aqueous aggregating medium, typically a sugar-syrup of sufficient moisture content to occasion partial wetting and consequent activation of the tackifying crystalline or granular hydrophilic material, whereby the latter is converted to an adhesive state and is functional to achieve an intended intimate particle-to-particle contact and adhesion in the presence of the sugar-syrup droplets. In this connection, it will be preferred that the second liquid spray be heated, say, to a temperature in the order of about 150° F whereat the crystalline aggregating or tackifying agent will per se be more adhesive and operative to cause greater cohesion of the alimentary granular or powderous mixtures present. Preferably, the triglyceride will also be hot and as applied will thus better coat and penetrate both the granular farinaceous and/or the proteinaceous (nutmeat) material.

The invention is characterized by the superior ability to achieve a controlled aggregation wherein particles of varying sizes and densities and thus varying segregating characteristics will be obtained within a wide range of tackifying formulations and conditions. For some food applications it may be desirable to employ in the particulate mix puffed or otherwise expanded particles which serve as matrix-building solids, e.g. puffed wheat or puffed rice produced by gun puffing or oven puffing. Alternatively, a cereal-based flake such as oat flake which when wetted despite its being fat coated has distinctive water absorptive properties which preferentially occasion absorption of water present in applied syrup, e.g. flaked cereals such as oat flakes produced by toasting a pelletized cooked cereal dough derived from oats, rice or corn may provide still other distinctive agglomerated structures all of which form a part of advantageous uses in practicing the present invention.

Intended rotation of various batches of granular and farinaceous, amylaceous or proteinaceous material and the intended coating thereof is a function of such variables as the rate of rotation of the aggregating drum, the angle of the drum axis, the relative volume of change to and volume in the drum and like factors interrelated in achieving the intended aggregate. The paddle means serve as propelling mechanisms which mechanically throw the discrete particles radially and axially in the direction of the discharge to the drum whereby a more complete coating of particles as well as a continual advancement thereof is effected. Through this "throwing" action the particles are caused to aggregate one to another while being fluidized by virtue of the plurality of induced collisions which are generated with the high speed rotation of the means mounting the paddles on the dual spray application mechanism.

In interpreting the practice of this invention, it is not to be specifically restricted to any distinct phase or plurality of phase operations since it should be understood that these integers of blending can overlap and indeed may be repeated and thus a plurality of dissimilar particles may be initially fat coated and thereafter built into small aggregates and by reason of random displacement through the churning action of the paddles just described they may be reintroduced to the first zone of fat application and returned to the second zone wherefrom they will ultimately be discharged, the process being repeated in accordance with the various intended effects desired, that is texture, taste and overall eating novelty.

The degree of intermixing will in part be dependent upon the angle of the plane of rotation of the paddle means which are respectively rotated coaxially or at least in an axis parallel to the axis of rotation of the dual liquid droplet generating means. Thus, said baffle planes may be perpendicular to the aforesaid axes or may be at an angle canted in the direction of movement intended either for a forward or reverse churning action all in accordance with skills of the art; in this respect, reference may be had to the structure shown in FIG. 3 of U.S. Pat. No. 3,362,688 to Fischer aforecited. However, in accordance with its most preferred embodiment, the invention has the paddles moving in a rotational plane which is substantially normal to the axis of rotation of the spray generating means whereby there is a moderate churning action with minimal tendencies to break or subdivide an agglomerate as it is generated.

Having described the various processes operative in achieving aggregation, the detailed description will not be focused upon the undulating path that the aggregate thus produced follows and the means employed to generate that path. As indicated in the aforesaid Fischer patents, the particles will enter an undulating structure, namely a plurality of zigzag V-s defined by interconnecting zigzag passages whose function is to establish and maintain a steady flow rate of discharge from the machine and to maximize blending effects and achieve agglomeration of the aggregates. The rolling motion is preferably generated by the zigzag portion of the machine operating about an axis which is parallel to the axis of rotation of the drum. The result of this action is to cause the aggregates per se to build into agglomerates at various spaced points of contact and yield heterogeneous granular irregularly surfaced coarse chunks of low bulk density. As the aggregates contact one another in the zigzag portion of the machine, this maximizes the surface areas in which respective aggregates are in contact and maximizes the frequency for such contact while at the same time continuing gentle tumbling action whereby gradual development of agglomerates to an intended particle size distribution can be achieved, it being understood that the number of such zigzags and the gentleness of the action inherent in the characteristic operation thereof are all functions of intended bulk volume and particle size distribution. Thus the initial stages of the zigzag portion of the machine are the beginning phases of agglomerate formation and the eventual finishing step occurs as the agglomerate is ready to be discharged from the terminal reaches of the zigzag structure.

Having described the operating details of the equipment, its practice can be accomplished by employing the following representative formulations of ingredients:

| Ingredient | Approximate Process Formula % As Is | Function |
|---|---|---|
| 1. Quick Cooking Table Rolled Oats | 27 | Flavor, texture, Nutrition |
| 2. Rolled Whole Wheat | 21 | Flavor, texture, Nutrition |
| 3. Almonds - diced | 5 | Flavor, texture, Nutrition |
| 4. Unsweetened Coconut | 5 | Flavor |
| 5. Nonfat Dry Milk | 5 | Flavor Enhancer, Nutrition |
| 6. Brown Sugar | 9 | Formula processing aid; sweetener |
| 7. Coconut Oil | 14 | Formula processing aid; texturizer |
| 8. Brown Sugar | 9 | Formula aid, |

| Ingredient | Approximate Process Formula % As Is | Function |
| --- | --- | --- |
| 9. Honey | 1 | sweetener Flavor enhancer; sweetness |
| 10. Water | 4 | Formula process aid |

The dry fraction consisting of ingredients 1–6 and representing approximately 72% of the blend ratio is charged to the mixing drum and is contacted by ingredient 7, the coconut oil, which is applied at a blend level of 14%. Thereafter, ingredients 8–10 are applied as a syrup fraction at a blend level of 14% to complete the agglomerate mixture, the blend ratios expressed being a percent of the blend per se that is introduced to the undulating section of the agglomerating unit. After agglomeration the agglomerate will have a solids content of approximately 91.4%, the balance being moisture and the agglomerate will be dried ideally to a moisture content of about 2% for stability purposes.

Having now described the various aspects of the invention, it should be interpreted in accordance with the accompanying claims.

What is claimed is:

1. A process for agglomerating granular material having dissimilarly sized and shaped food particles of varying densities which comprises: charging said material and a discrete granular tackifying liquid-activatable composition to a first zone in a rotating vessel wherein said material is tumbled; centrifugally and continuously discharging from a rotating first spray head radially within said first zone a finely dispersed array of droplets of a first liquid, the rotational rate of the vessel being such in relation to the rate of discharge from the first spray head as to cause tumbling material to cascade into and be intercepted by said droplets and be coated thereby by migration through the particles and absorption therein, said coating action being promoted by paddles that rotate with said head and churn the particles undergoing said coating action by mechanically throwing the particles radially and axially; advancing the tumbling churned coated particles in said vessel to a second zone distinct from said first zone wherein they are contacted by a continuously and centrifugally finely dispersed discharged array of droplets of an adhesive second liquid from a second rotating spray head within said vessel whereupon the adhesive and tackifying properties of the previously coated particles are activated causing aggregation thereof, said second liquid having a composition different from the first liquid, said aggregating action being promoted by second paddles that rotate with said head and cause mechanical throwing of the coated particles radially and axially to effect churning, mixing and aggregation; and continuing rotation of said vessel to discharge the aggregates to an undulation zone wherein they are subjected to successive changes in direction and agglomerated into chunks of lower density than said aggregates.

2. A process according to claim 1 wherein the charge of material comprises a mixture of amylaceous and proteinaceous material.

3. A process according to claim 2 wherein the first liquid is a triglyceride and the second liquid is a sugar syrup.

4. A process according to claim 3 wherein the material charged to the vessel contains a powderous carbohydrate tackifying agent.

5. A process according to claim 4 wherein the tackifying agent is a crystalline or amorphous sugar.

6. A process according to claim 3 wherein the triglyceride is heated to above its melting point.

7. A process according to claim 3 wherein the syrup is heated to above ambient conditions.

8. A process according to claim 1 wherein a portion of the particles in the first zone are churned by means operative to repetitively contact, displace and agitate the particles in the first zone.

9. A process according to claim 8 wherein the coated particles in the second zone are churned by means operative to repetitively contact, displace and agitate the particles in the second zone to promote aggregation thereof.

* * * * *